Patented June 15, 1926.

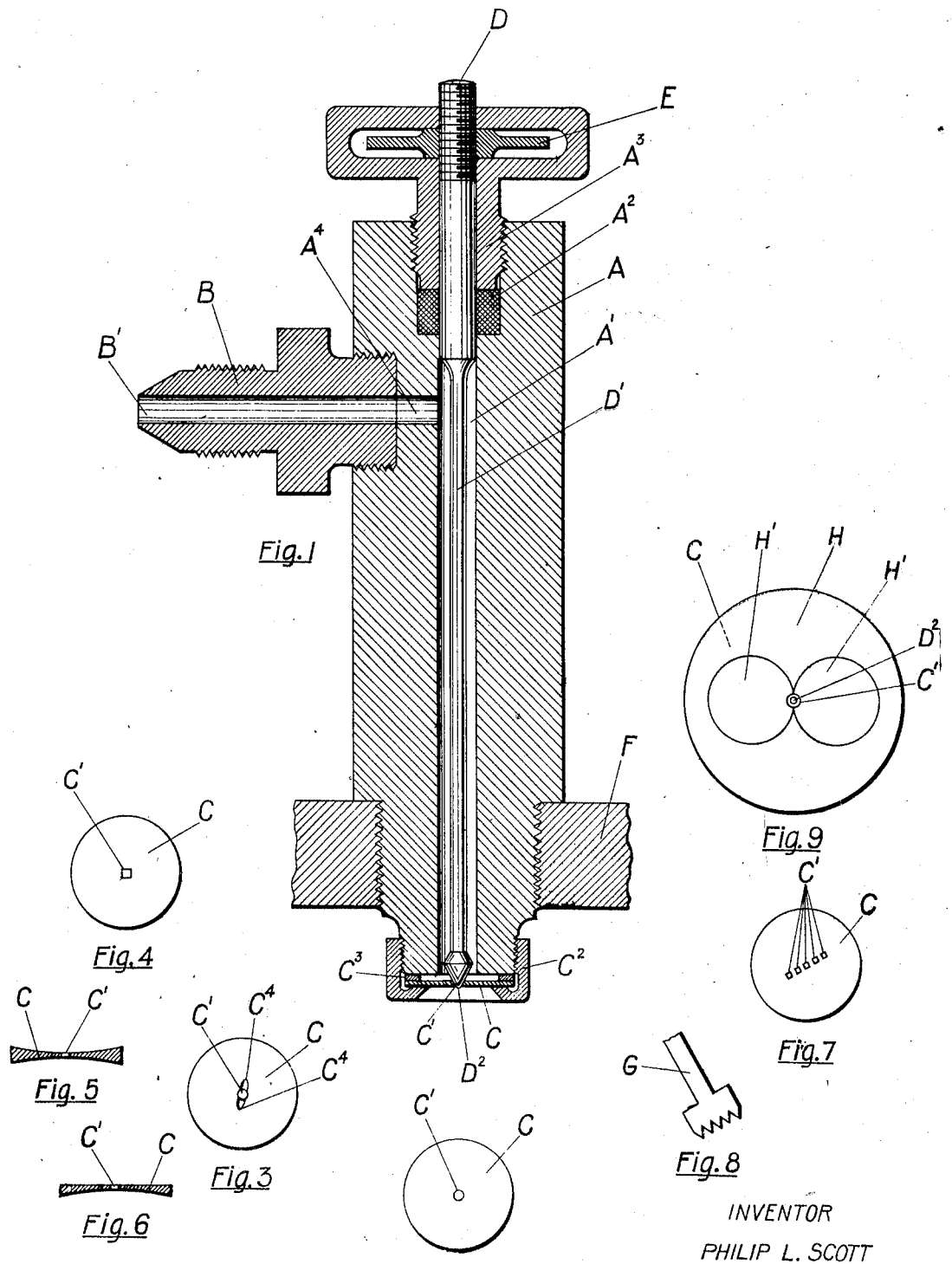

1,589,238

UNITED STATES PATENT OFFICE.

PHILIP L. SCOTT, OF THREE OAKS, MICHIGAN, ASSIGNOR TO SUPER-DIESEL TRACTOR CORPORATION, OF LA PORTE, INDIANA, A CORPORATION OF NEW YORK.

INJECTION VALVE.

Application filed July 3, 1919. Serial No. 308,445.

My invention relates to injection valves for internal combustion engines adapted to be used for the solid, direct injection of fuel into a combustion chamber under pressure without the use of any air or gas under pressure.

This present device takes the form of a perforated disc rigidly supported about its periphery and associated with a member which closes the perforation when liquid fuel is introduced, exerting a pressure against the disc which tends to deflect or bend it so as to bring the disc out of engagement with the closing member, thus permitting the passage of the liquid through the minute opening between the closing member and the walls of the perforation.

It may happen and has happened that when the disc was too heavy and strong, the pressure actually caused a raising up of the entire needle valve stem, and a giving or yielding of the yoke holding it down, but in any event some stiff and heavy part or some more or less rigidly supported part must give a very short distance to permit the opening of the valve.

My invention is illustrated in the accompanying drawings wherein—

Figure 1 is a vertical section of the preferred form of my valve;

Figure 2 is a plan view of one form of disc;

Figure 3 is a plan view of a disc upon the surface of which are radial scratches terminating in the perforation;

Figure 4 is a disc in which the perforation is angular;

Figure 5 is a vertical section of a modified form of disc;

Figure 6 is a vertical section of a further modification;

Figure 7 is a plan view of a disc in which there is a plurality of perforations;

Figure 8 is a multiple needle point for use with such a disc;

Figure 9 is a plan view of a disc similar to that shown in Figure 2 in which I have provided a reinforcing cap adapted to overlie the disc proper and provided with two substantially circular openings tangent at a point in register with the perforation of the disc.

Like parts are indicated by like characters in all the figures.

A is the body of an injection valve having the central bore $A^1$ enlarged at its upper end. $A^2$ is a packing in said enlargement. $A^3$ is a supporting member screw-threaded into the enlargement of the bore $A^1$. The valve body is screw-threaded into an engine cylinder wall F which is of course, only diagrammatically shown.

B is an inlet connection having the central bore $B^1$ in register with the bore $A^4$ of the valve and communicating through it with the central bore $A^1$.

C is a valve disc having a perforation $C^1$. It is held to the valve body by the retaining cap $C^2$ and is spaced from it by the gasket ring $C^3$.

D is a valve stem in the central bore $A^1$, reduced throughout the greater part of its length as at $D^1$, and terminating in an enlarged valve head or point $D^2$ which engages the disc C, and normally closes the perforation $C^1$.

The end wheel E engaging the screw-threaded end of the stem D is adapted to move the point $D^2$ toward and from the disc C to vary the pressure upon the disc and thus predetermine the pressure at which the valve head and disk will be separated to provide the proper discharge opening.

I have shown in Figures 3 to 9 inclusive, series of modified forms of valve discs adapted to be used in the general device which I have shown. For instance: in Figure 3, the aperture $C^1$ is distorted as by scratches or slots which extend its effective length or diameter, at certain points. Such a device as this would be used with the point $D^2$. The same is true of the device shown in Figure 4. Figures 5 and 6 show thicker valve discs thinned at the center so that the support to the valve disc is greater and it is not necessary to carry the cap $C^2$ as far in toward the center as shown in Figure 1. In Figure 9, the cap H is modified in that it has two tangential apertures $H^1$ $H^1$ therein. These apertures provide points in the body of the cap which terminate very close to the perforation $C^1$ and thus support two sides of it leaving the remainder free and unsupported. The object of this, as of all the arrangements shown, is to control or modify the shape or position of the spray. The device of Figures 1, 2, 5, and 6 will give a normally conical spray. The devices of Figures 3 and 9 will give a fan shaped spray. The device of Figure 4 will give a general conical shaped spray but possibly a little thicker at the corners.

In Figures 7 and 8, I have shown a further modification in that the disc C has a series of perforations. I have shown them square though, of course, they might be of other shapes. This series of perforations is engaged by the valve head or points GG carried on the valve stem D. These perforations may be smaller than any one of the single perforations and experience develops the interesting fact that under certain conditions, I am able to get a very satisfactory spray with the device of 7 and 8 with much lower pressure than with the other devices. I have shown these different spray discs and points because they all have one thing in common, namely: the valve is closed by the pressure of a valve stem forcing a point against a disc and thus closing an aperture therein, and the only way in which the fuel under pressure in the fuel system can get out, is by actually separating the disk and valve head or valve point so as to provide a clearance between the valve point and the disc. This is the deformation of the actual material itself and it will be understood that the greater the initial tension of the spring disc, set up by the pressure of the valve stem against the disc, the greater must be the pressure of the liquid which separates the disk and the valve points.

Another characteristic, of course, is that I have both an actual stretch of the metal and a deflection of the metal, as the valve discs give although the stretch is exceedingly minute and the giving of the disk only microscopic and the disk from the point of view of spring design may be designated as being substantially inflexible, this term being here used to mean a disk so resistant as to permit only sufficient bending to provide an opening only substantially microscopic transversely of the flow of the material, under the high pressure used. The result of this is that I have what is, in effect, an exceedingly stiff spring, and the yielding of the disc, as the pressure increases, is but slight thus a very narrow aperture is made for the passage of the fuel and the valve closes up again, immediately the pressure has dropped down below the point at which the release is expected to take place. In fact in designing the structure the important problem is to substantially prevent or limit spring action rather than to secure it in order to insure the substantially microscopic opening transverse to the flow of the material.

One peculiar characteristic of the device wherein I have a plurality of needle points, is that the two needle points at either end of the group engage the corresponding holes in the disc and act as guides to position and center the other needle points in the remaining holes because the deflection of the disc which is outwardly carried when the pressure is applied to it permits an opening of the intermediate hole while the end holes and points are still in contact. Any of the disks herein shown are adapted to be provided with a plurality of holes if desired.

In the form of mechanism here shown, my minute opening is uncovered or made effective or produced by the deflection or spring like action of the material of which the valve is composed, but it is conceivable, of course, that such a microscopic opening could be developed or uncovered by other means. A valve seat so shaped with reference to the valve that some portions of the seat will offer unequal resistance to flow, thereby confining the spray to certain portions or causing it to flow with greater thickness at certain points, may be employed. This is illustrated for example, in the application of the conically shaped valve point $D^2$ shown in Figure 1 to the disc having a square hole, illustrative in Figure 4. On the other hand a valve seat may be formed so that the varying thickness or tension of the metal will cause the valve to yield unequally at different points along the seat, thereby giving a desired shape to the spray. This is illustrated in Figure 9. The valve point $D^2$ of the device as illustrated in the drawing, is intended to be forced into the opening whatever shape it may have in the disc until it closes the opening and what has just been said about the possible peculiarities of the valve seats, will follow from the application of a valve of a given type to a disc having a hole of dissimilar shape or to a disc having unequal support about the hole.

The use and operation of my invention are as follows:—

Whatever form of spray opening I employ or whatever form of apparatus is used in connection therewith and in whatever manner the opening is produced responsive to the pressure of the fluid, the opening must, in its narrow dimension or width, be microscopic, while its other dimension or length, must be such as under the conditions to produce a uniform spray. Of course, it would be possible to use a microscopic opening and sacrifice the uniformity of the spray. This would not be good practice. The essential thing at least, is the microscopic opening. With respect to the particular form of mechanism here illustrated the operation is as follows:

With whatever form of disc used, the operation is similar. The disc is positioned against the end of a valve body and the needle point or points, by means of the adjusting screw, are thrust into the perforations of the disc, so as to make a tight fit, Fuel is then supplied under pressure to the central bore of the valve. By means of this pressure, the valve disc is slightly deflected so as to provide sufficient clearance between it and them to allow fuel to be forced through the clearance thus formed and into the combustion chamber.

My experience seems to show that while many different devices may be used by me for accomplishing the fine atomization or spray of the liquid, still they all have in common the fact that the valve opens such a very slight amount as to permit the liquid to pass through an exceedingly minute passage and it is because of this minute passage that I get the desired result. In any event, the common thing that experience shows is essential is a valve which opens but a very small distance and provides an excessively minute passage through which the material may be forced.

I have used the term disc, but do not wish to be limited to any particular configuration. A device suitable for the purpose might have any perimeter. It might be circular or rectangular or otherwise. As previously suggested, I have here shown a particular form of device which in operation develops a fluid inlet opening of microscopic width and I do not wish to be limited to the particular form shown.

Another important object in having the fluid inlet opening of microscopic width is the fact that when the supply is discontinued, the valve portions being separated by a microscopic distance can instantly resume their closed or fixed or normal positions so as to instantly cut off the supply of fuel and prevent drooling or anything analogous to it. In the structure shown, the disc itself is elastic and comprises a very small amount of material which is in close proximity to the opening and in any such form of the device, that is where the moving part is small and in close proximity to the opening, the inertia of the valve mass that must be started and stopped at each opening, is reduced to a minimum and little of the closing energy wasted in lieu of starting and stopping metal masses. By putting the elastic parts under greater strain, the resistance to the deflection can be increased and the elastic force of closing increased so as to facilitate the above described action. By utilizing means to increase adjustably the stress with which the valve and valve seat or valve forming parts are held in contact, the degree of pressure at which the valve will uncover its opening, can be altered and thereby the pressure of the initial flow regulated. It will be understood, of course, that where I have spoken of a single perforation or opening, I have done so to describe the particular mechanism shown but the operation is equally within the scope of my invention where more than one opening is used. One specific form of multiple opening has been shown but others could be used.

Valves which require to be operated at very frequent intervals present a difficulty in that the metal mass required to be moved, in order to uncover the valve opening has to be accelerated to high velocities or in other words, such mass is subject to great acceleration and thus requires relatively large amounts of energy and is subjected to great strains. I have overcome that by reducing to a minimum the mass of metal subject to acceleration and further so arranging the valve that the portions subject to the greatest acceleration contain the smallest mass and the portions of greatest mass are subjected to the least acceleration. In the particular form of valve here illustrated, I accomplish this result by using a disc like seat which is deflected most at the point nearest the opening. Of course, the same idea can be expressed in widely differing structures. The difficulty is a very serious one and in structures of this nature, valves, where considerable masses of material are to move, consume a large amount of energy and are liable to break.

The spray which I have in mind is a spray so thin that it perhaps approaches molecular dimensions and the line of origin of the spray is so short as to insure what is known as a uniform spray. In one case I produce a spray opening which, as near as I can calculate it or estimate it without attempting very accurate measurement, was approximately one fortieth of an inch in length and the spray thickness one tenthousandth of an inch. Of course it will be understood that these figures and expressions are intended only for illustrative purposes, but that they indicate in a general way what I mean by the expression "microscopic" as applied to the effective width of the spray opening, that is the effective dimension transversely of the direction of flow. This spray opening, therefore, to secure the best result, must be small enough to make a spray so thin that it approaches molecular dimensions, and by molecular dimensions I mean the thinning out of the liquid so that but comparatively few molecules may pass abreast, so that substantially all the particles, when the liquid is atomized, will be similar to the particles of water in a cloud, that is the normal relation between the air and the liquid is so changed that substantially all of the small aggregations of molecules of the material float in the air and are in a vaporous form, and it is of the essence of the invention that the mechanism used must have the resisting capacity sufficient to resist the pressures to limit the separation of the members so that only a substantially microscopic opening transversely of the direction of flow, for the discharge of the material will be formed. From the point of machine design, the term substantially inflexible may be applied, for example, to the disc C, for the bending of the disc under the high pressure used must be but slight to secure an opening of only substantially microscopic dimension transversely of the direction of flow.

Referring to the disc shown in Figure 4 wherein the conical valve head D² is used therewith the head-engaging portion of the disc, when the valve is in use, is of different widths in the direction of flow due to the initial dissimilarity in cross section of the head and the aperture in the disc which wears to a mating surface of an irregular width upon assembly and "running in", and consequently offers varying resistance to the passage of the liquid on the microscopic separation of the head and disc due to the pressure within the nozzle.

I claim:

1. In a spray nozzle, a perforated disc, a fixed valve member arranged to normally close the perforation, means for supplying liquid under pressure to said disc on the same side as the valve member, to deflect the disc, open the perforation, and discharge the liquid, the disc being supported about its periphery and being free to deflect centrally, and being relatively thick at its periphery and becoming progressively thinner toward the central perforation.

2. In a spray nozzle, a perforated disc, a fixed valve member arranged to normally close the perforation, means for supplying liquid under pressure to said disc on the same side as the valve member, to deflect the disc, open the perforation, and discharge the liquid, and means for forcing the valve member adjustably against the disc to put it under an initial tension, the disc being supported about its periphery and free to deflect centrally, and being relatively thick at its periphery and becoming progressively thinner toward the central perforation.

3. In a spray nozzle, a perforated disc, a fixed valve member arranged to normally close the perforation, means for supplying liquid under pressure to said disc on the same side as the valve member, to deflect the disc, open the perforation, and discharge the liquid, the disc being relatively thick at its periphery and becoming progressively thinner toward the central perforation.

4. In a spray nozzle, a perforated disc, a fixed valve member arranged to normally close the perforation, means for supplying liquid under pressure to said disc on the same side as the valve member, to deflect the disc, open the perforation, and discharge the liquid, and means for forcing the valve member adjustably against the disc to put it under an initial tension, the disc being relatively thick at its periphery and becoming progressively thinner toward the central perforation.

5. In a spray nozzle, a perforated stiff disc, a fixed valve member arranged to normally close the perforation, means for admitting liquid under pressure to said disc on the same side as the valve member, to bend the disc and open the perforation, to provide an atomizing orifice through which liquid is discharged in the form of a spray, the valve member being tapered so as to penetrate the perforation.

6. In a spray nozzle, a perforated stiff disc, a fixed valve member arranged to normally close the perforation, means for admitting liquid under pressure to said disc on the same side as the valve member, to bend the disc and open the perforation, to provide an atomizing orifice through which liquid is discharged in the form of a spray, the disc being supported about its periphery and being free to deflect centrally, the valve member being tapered so as to penetrate the perforation.

7. In a spray nozzle, a perforated stiff disc, a fixed valve member arranged to normally close the perforation, means for supplying liquid under pressure to said disc on the same side as the valve member, to bend the disc, open the perforation, and discharge the liquid, and means for forcing the valve member adjustably against the disc to put it under an initial tension, the valve member being tapered so as to penetrate the perforation and center therein.

8. In a spray nozzle, a perforated stiff disc, a fixed valve member arranged to normally close the perforation, means for supplying liquid under pressure to said disc on the same side as the valve member, to bend the disc, open the perforation, and discharge the liquid, and means for forcing the valve member adjustably against the disc to put it under an initial tension, the disc being supported about its periphery and free to deflect centrally, the valve member being tapered so as to penetrate the perforation and center therein.

9. In a spray nozzle, a perforated disc, a fixed valve member arranged to normally close the perforation, means for supplying liquid under pressure to said disc on the same side as the valve member, to deflect the disc, open the perforation, and discharge the liquid, the disc being supported about its periphery and being free to deflect centrally, and being relatively thick at its periphery and becoming progressively thinner toward the central perforation, the valve member being tapered so as to penetrate the perforation and center therein.

10. In a spray nozzle, a perforated disc, a fixed valve member arranged to normally close the perforation, means for supplying liquid under pressure to said disc on the same side as the valve member, to deflect the disc, open the perforation, and discharge the liquid, and means for forcing the valve member adjustably against the disc to put it under an initial tension, the disc being supported about its periphery and free to deflect centrally, and being relatively thick at its periphery and becoming progressively thinner toward the central perforation, the valve member being tapered so as to penetrate the perforation and center therein.

11. In a spray nozzle, a perforated disc, a fixed valve member arranged to normally close the perforation, means for supplying liquid under pressure to said disc on the same side as the valve member, to deflect the disc, open the perforation, and discharge the liquid, the disc being relatively thick at its periphery and becoming progressively thinner toward the central perforation, the valve member being tapered so as to penetrate the perforation and center therein.

12. In a spray nozzle, a perforated disc, a fixed valve member arranged to normally close the perforation, means for supplying liquid under pressure to said disc on the same side as the valve member, to deflect the disc, open the perforation, and discharge the liquid, and means for forcing the valve member adjustably against the disc to put it under an initial tension, the disc being relatively thick at its periphery and becoming progressively thinner toward the central perforation, the valve member being tapered so as to penetrate the perforation and center therein.

13. In a spray nozzle the combination of a valve and a seat comprising a substantially inflexible disc apertured to provide a spray outlet, said valve being normally in close engagement with said seat to cut off communication between the interior of said nozzle and said outlet, said disc adapted to yield under a predetermined pressure to develop a spray-forming opening of substantially microscopic dimension transversely of the direction of flow, between said valve and seat leading to said outlet.

14. A nozzle device for liquids having cooperating orifice forming members normally in close engagement with each other, said members adapted to be separated by the pressure of the liquid in the nozzle to form a passageway for the discharge of the liquid, the rigidity of said members resisting their separation so as to permit the development of an orifice of only substantially microscopic dimension transversely of the direction of flow, whereby the liquid forced therethrough issues in a vaporous form.

15. An injection valve comprising two parts, normally in close engagement, one of said parts being of a material enabling it to be deflected responsive to the pressure of the fluid fuel to develop a fluid inlet opening of substantially microscopic width only, whereby the liquid forced therethrough approaches molecular dimensions and is discharged in a vaporous form.

16. An atomizing injection valve comprising cooperating orifice forming members normally in close engagement with each other, said members adapted to be separated by the pressure of the liquid fuel to form an orifice for the discharge of said fuel, the rigidity of said members resisting the separation thereof so as to permit the development of an orifice of only substantially microscopic dimension transversely of the direction of flow, said orifice having opposed walls inclined to the axis of the atomizing jet discharged from the nozzle.

17. In an atomizing injection valve, the combination of a substantially inflexible valve disc having a perforation therein and a needle point adapted to penetrate therein and normally to close said perforation, said disc adapted to bend under the pressure of the fluid fuel so as to open said perforation to form an atomizing opening of substantially microscopic width.

18. In an atomizing injection valve, the combination of a substantially inflexible valve disc having a perforation therein and a needle point adapted to penetrate therein and normally to close said perforation, said disc adapted to bend under a predetermined pressure of the fluid fuel so as to open said perforation at a predetermined time to form an atomizing opening of substantially microscopic dimension transversely of the direction of flow.

19. In an atomizing injection valve, the combination of a substantially inflexible valve disc having a generally circular perforation therein and a needle point adapted to penetrate therein and normally to close said perforation, said disc adapted to yield to the pressure of the fluid fuel so as to open said perforation to form an atomizing opening of substantially microscopic dimension transversely of the direction of flow.

20. In an atomizing injection valve, the combination of a substantially inflexible valve disc having a plurality of perforations, with needle points adapted to penetrate within and normally to close said perforations, said disc adapted to bend under the pressure of the fluid fuel so as to open said perforations to form atomizing orifices each of substantially microscopic dimension transversely of the direction of flow.

21. In an injection valve, the combination of a valve disc having a perforation therein and a valve head with a point adapted to enter such perforation and normally to close it, the head-engaging portions of the disc being of different widths and consequently offering varying resistance to the passage of the liquid on the microscopic separation of the head and disc due to fluid pressure within the nozzle.

22. An injection valve comprising two coacting parts, one elastic, contiguous to the valve opening, said valve parts under an initial stress so as to cause the uncovering of the valve opening at a predetermined pressure of the fluid fuel, and means for varying such initial stress to adjust the valve to work at various pressures.

23. In an atomizing injector valve the combination of a substantially inflexible disk having a plurality of perforations, a group of needle points adapted to penetrate within and normally close said perforations, said disk adapted to bend under the pressure of the fluid fuel so as to open certain of said perforations, to provide openings of only substantially microscopic dimensions transversely of the direction of flow, the needle points at each end of said group acting as guides to position and centre the intermediate needle points whereby a better distribution of flow is secured.

In testimony whereof, I affix my signature this 25th day of June, 1919.

PHILIP L. SCOTT.